(12) United States Patent
Wieczorek et al.

(10) Patent No.: US 7,204,539 B2
(45) Date of Patent: Apr. 17, 2007

(54) VISOR NAIL

(75) Inventors: Joseph P. Wieczorek, Lake Orion, MI (US); Rodney Slobodian, Sterling Hts., MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 0 days.

(21) Appl. No.: 11/350,959

(22) Filed: Feb. 9, 2006

(65) Prior Publication Data

US 2006/0123614 A1    Jun. 15, 2006

Related U.S. Application Data

(62) Division of application No. 10/779,224, filed on Feb. 12, 2004, now Pat. No. 7,025,400.

(51) Int. Cl.
*B60J 3/00* (2006.01)

(52) U.S. Cl. ...................................... 296/97.9

(58) Field of Classification Search ............. 296/97.1, 296/97.9, 97.11, 97.12, 97.13
See application file for complete search history.

(56) References Cited

U.S. PATENT DOCUMENTS

| 4,417,761 | A |   | 11/1983 | Cziptschirsch et al. |
| 4,582,356 | A |   | 4/1986  | Kaiser et al. |
| 4,617,699 | A | * | 10/1986 | Nakamura ............ 16/262 |
| 4,679,843 | A |   | 7/1987  | Spykerman |
| 4,763,946 | A |   | 8/1988  | Robbins et al. |
| 4,821,374 | A | * | 4/1989  | Gavagan ............... 16/321 |
| 4,902,063 | A | * | 2/1990  | Crink ............... 296/97.11 |
| 4,925,233 | A |   | 5/1990  | Clark |
| 5,031,951 | A | * | 7/1991  | Binish .............. 296/97.1 |
| 5,031,953 | A | * | 7/1991  | Miller ............... 296/97.9 |
| 5,169,203 | A | * | 12/1992 | Lawassani et al. ..... 296/97.1 |
| 5,338,083 | A | * | 8/1994  | Gute ................. 296/97.9 |
| 5,409,285 | A | * | 4/1995  | Snyder et al. ...... 296/97.11 |
| 5,411,310 | A | * | 5/1995  | Viertel et al. ....... 296/97.9 |
| 5,466,405 | A | * | 11/1995 | Viertel et al. ....... 264/45.4 |
| 5,603,547 | A | * | 2/1997  | Finn et al. ......... 296/97.1 |
| 5,653,490 | A | * | 8/1997  | Fink et al. ........ 296/97.11 |
| 5,716,092 | A | * | 2/1998  | Dellinger et al. ..... 296/97.1 |
| 5,887,933 | A | * | 3/1999  | Peterson ............ 296/97.1 |
| 6,010,175 | A | * | 1/2000  | Bodar et al. ....... 296/97.11 |
| 6,024,399 | A | * | 2/2000  | Viertel et al. ...... 296/97.11 |
| 6,059,348 | A | * | 5/2000  | Viertel et al. ....... 296/97.9 |
| 6,093,277 | A | * | 7/2000  | Assink et al. .......... 156/292 |
| 6,131,985 | A | * | 10/2000 | Twietmeyer et al. .. 296/97.12 |
| 6,220,644 | B1 | * | 4/2001 | Tiesler et al. ....... 296/97.11 |
| 6,438,804 | B1 | * | 8/2002 | Romero Magarino ..... 24/289 |
| 6,454,507 | B1 | * | 9/2002 | Romero Magarino ..... 411/508 |
| 6,530,773 | B2 | * | 3/2003 | Bearman et al. ........ 425/503 |

* cited by examiner

*Primary Examiner*—Lori L. Coletta
(74) *Attorney, Agent, or Firm*—Raggio & Dinnin, P.C.

(57) ABSTRACT

The present invention provides a method of manufacturing a sun visor for a motor vehicle. The method includes the steps of positioning a nail substantially parallel a longitudinal edge of a clamshell visor half and driving the nail though a clip rod positioned in a clip rod recess. The nail is preferably driven by sliding a visor pivot rod or attached slider against one end thereof, driving the nail through the clip rod and securing the same in the recess.

22 Claims, 2 Drawing Sheets

VISOR NAIL

This is a divisional of application Ser. No. 10/779,224, filed Feb. 12, 2004 now U.S. Pat. No. 7,025,400.

TECHNICAL FIELD

The present invention relates generally to adjustable sun visors for use in motor vehicles, and relates more particularly to a method and design for a visor wherein during assembly a nail member is driven across a recess in a body of the visor and longitudinally through a clip rod to secure the clip rod in the recess.

BACKGROUND OF THE INVENTION

Sun visors are well known and widely used, and a great many designs have been successfully employed in vehicles over the years. Engineers have developed a variety of ways by which visor bodies and other interior components may be constructed and mounted in a vehicle to enhance functionality or aesthetic appeal. Advances in design, however, can often add complexity to the manufacturing process for interior components. There has been and continues to be a premium in the automotive industry on cost savings, and improvements in the efficiency and speed of manufacturing processes are often welcomed by the industry. An area of particular focus in automobile technology has been reducing the number and complexity of steps required to assemble interior components such as visors.

Many visors are constructed with a "clamshell" type design, involving the molding of two plastic shell pieces or clamshell halves which are joined to form the visor body. Upholstery coverings are then typically mounted over the visor body. The clamshell design allows the visor body to be constructed relatively quickly and easily, however, the various components attached to the visor clamshell halves must in some cases be incorporated with several assembly steps prior to securing the clamshell halves together. For example, several known designs require multiple mounting or securing steps to position and retain the visor clip rod in a recess in the visor body. The construction of visors having such a design is relatively time intensive. Eliminating parts and steps in assembly can reduce the expense of manufacturing and constructing the visor. It is thus desirable to provide a design wherein a component such as the visor clip rod can be secured relatively quickly and easily during manufacturing.

SUMMARY OF THE INVENTION

In one aspect, the present invention provides a clamshell visor including first and second visor shells, and a clip rod. During assembly a nail member is driven across a recess and through the clip rod, securing it in position. The nail is preferably driven with a slider mechanism attached to the visor pivot rod, or with the pivot rod itself.

In another aspect, the present invention provides a method of manufacturing a sun visor for a motor vehicle. The method includes the steps of positioning a nail substantially parallel a longitudinal edge of a visor shell, and driving the nail through a clip rod positioned in a clip rod recess in the visor shell. The nail is preferably driven by sliding a visor pivot rod or an attached member against one end thereof, thereby driving the nail through the clip rod and securing the same in the recess.

DETAILED DESCRIPTION OF PREFERRED EMBODIMENTS

Figure 1:
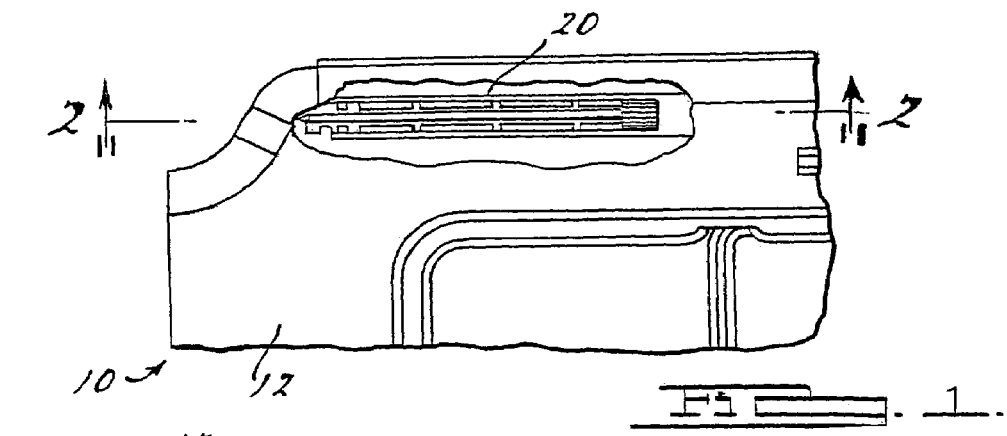
FIG. 1 illustrates a visor shell having a nail positioned therein in a pre-installed position prior to driving the nail through a clip rod, in accordance with a preferred embodiment of the present invention.
Figure 2:
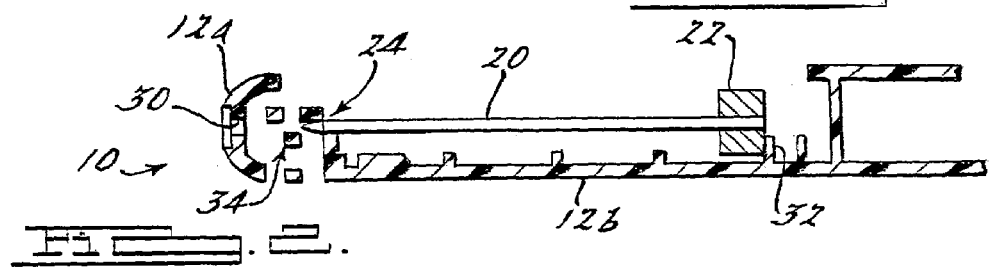
FIG. 2 is a sectioned side view taken along line A—A of FIG. 1.
Figure 3:
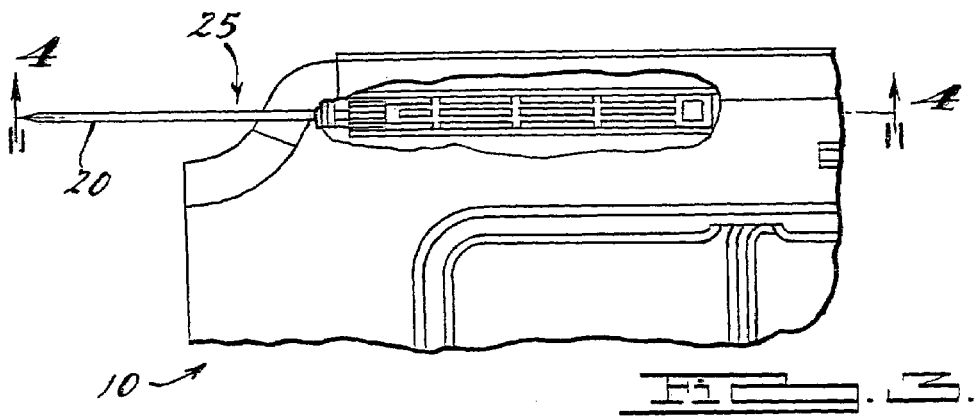
FIG. 3 illustrates a visor shell having a nail positioned therein in an installed position.
Figure 4:
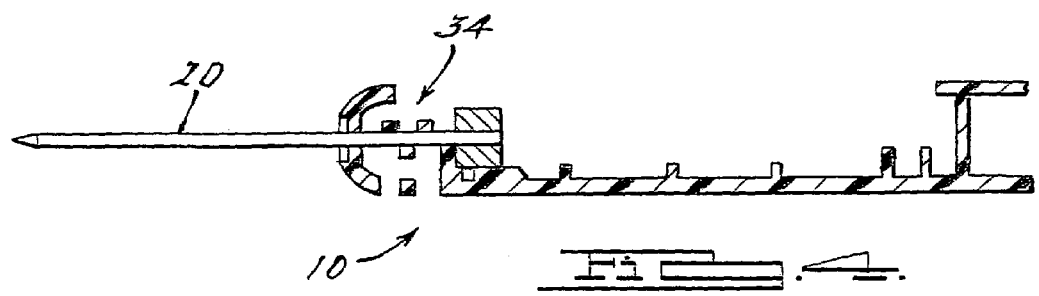
FIG. 4 is a sectioned side view taken along line A—A of FIG. 3.

Referring to FIGS. 1 and 2 there is shown a visor 10 according to a preferred embodiment of the present invention. Visor 10 includes a visor body 12, with a nail member 20 positioned therein. Nail member 20 preferably includes an enlarged plastic head portion 22, and a sharpened or pointed tip 24. As illustrated in FIG. 2, visor body 12 preferably comprises first and second visor shell halves 12a and 12b. Visor halves 12a and 12b are preferably molded plastic, and are engageable to form a clamshell-type visor body. In a preferred embodiment, visor shell halves 12a and 12b define an aperture 30, through which nail member 20 may be pushed to secure a clip rod, as described herein. In a preferred embodiment visor shell halves 12a and 12b each include a plurality of molded supporting protrusions 34, which guide nail member 20 as it is slid through aperture 30. A molded plastic stop 30, in cooperation with protrusions 34, preferably assists in properly orienting nail 20 when positioned in visor body 12. The present invention broadly provides a method of assembling a visor wherein nail 20 is slid through aperture 30, through a clip rod (not shown in FIGS. 1 and 2), with a slider or pivot rod (also not shown in FIGS. 1 and 2), thereby securing a clip rod in the visor body. FIGS. 3 and 4 illustrate visor 10 with nail member 20 in an installed position, traversing a recess 25.

Figure 5:
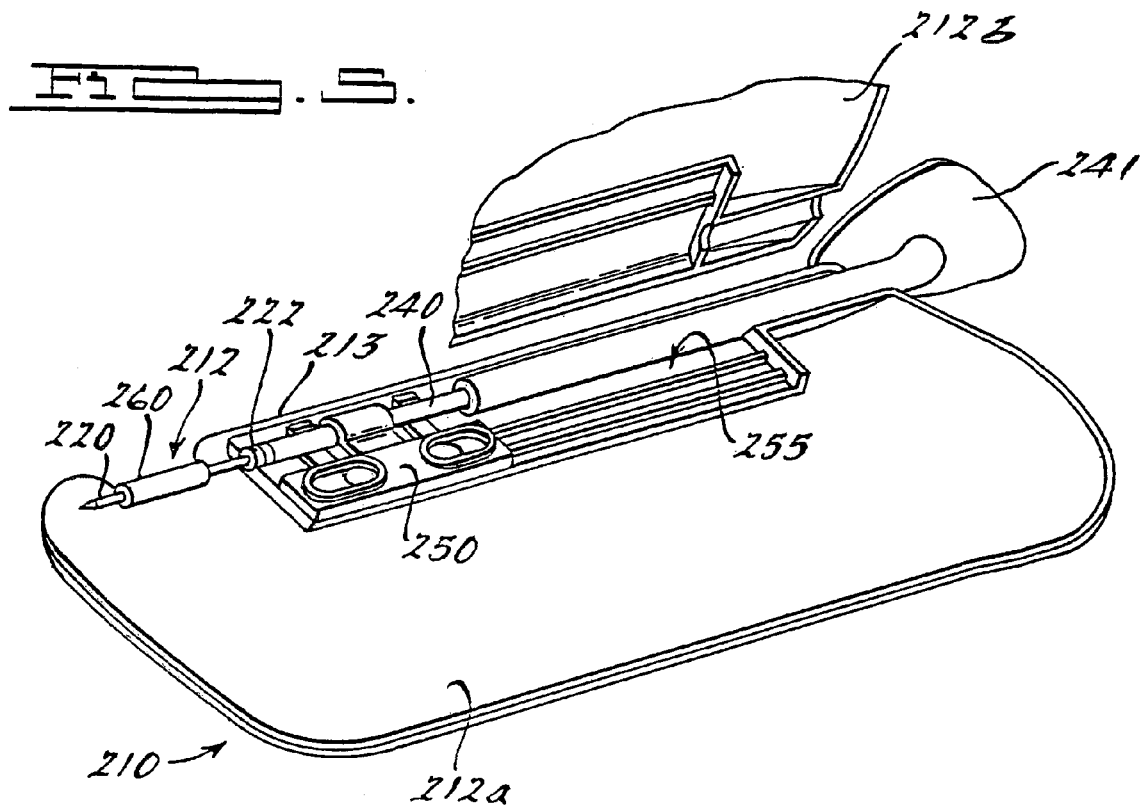
FIG. 5 is a perspective view of a visor according to a preferred embodiment of the present invention.

Referring now to FIG. 5, there is shown a visor 210 with a visor nail 220 that has been pushed across a recess 212, through a clip rod 260, thereby securing the same in recess 212. In the FIG. 5 embodiment, a combination slider and detent mechanism 250 rotatably journals a visor pivot rod 240. During assembly of visor 210, pivot rod 240 and slider 250 are positioned within a channel 255 defined by one or both of the visor shell halves 212a and 212b. To assemble the visor, first and second shell halves 212a and 212b are closed about pivot rod 240 and slider 250 with nail 220 positioned proximate clip rod recess 212. After the shell halves 212a and 212b are engaged, slider 250 and pivot rod 240 can be slid along channel 255, preferably defined in part by first shell half 212a and also in part by second shell half 212b, bringing an end of pivot rod 240 into engagement with enlarged head 222 of nail 220. A technician can grasp one end of pivot rod 240, or a sleeve and mounting assembly 241, and manually push nail 220 across recess 212, capturing clip rod 260 therein. Prior to engaging visor shell halves 212a and 212b, nail 220 is preferably positioned in visor shell half 212a, and may be supported by supporting protrusions (not shown in FIG. 5) similar to those depicted in FIGS. 1–4.

In a preferred embodiment nail 220 will be oriented substantially parallel with a longitudinal edge 213 of shell half 212a. Similarly, clip rod 260 is preferably oriented substantially parallel longitudinal edge 213. Thus, when an axial force is applied to pivot rod 240, pivot rod 240 can drive nail 220 through clip rod 260. Embodiments are contemplated wherein an inner diameter of clip rod 260 is substantially equal to an outer diameter of nail 220, as well as embodiments wherein the inner diameter of clip rod 260 is larger than an outer diameter of nail 220 such that clip rod 260 is rotatably journaled by nail 220.

Figure 6:
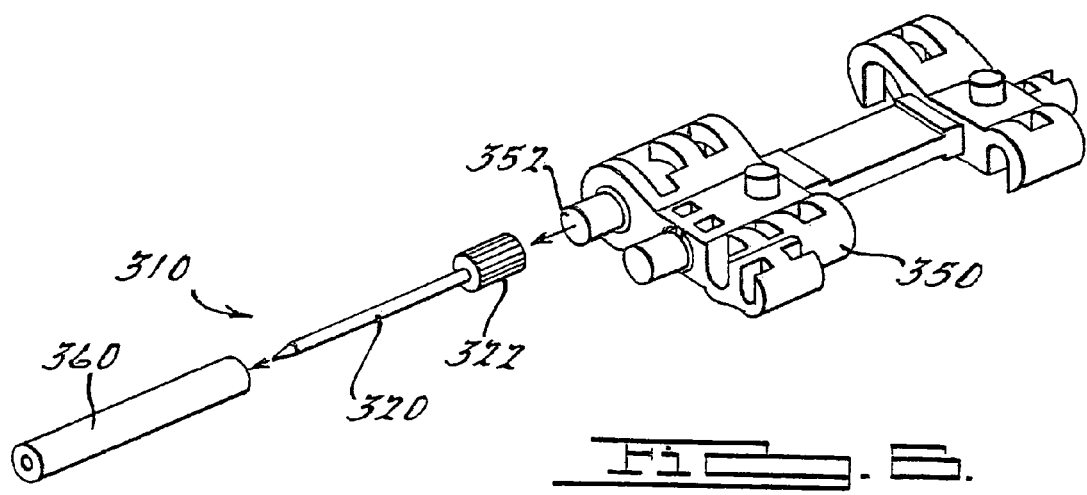
FIG. 6 is an exploded view of a slider, nail and clip rod according to a preferred embodiment of the present invention.

Turning now to FIG. 6, there is shown an alternative embodiment of the present invention 310 which includes a clip rod 360, a nail 320, with an enlarged head 322, and a slider 350. In the FIG. 6 embodiment, slider 350 includes a protruding end member 352 that can engage head 322 for pushing of nail 320 into engagement with clip rod 360. In a preferred embodiment, a detent mechanism, for example a clip detent (not shown) may be engaged with slider 350, to rotatably journal a pivot rod (not shown), and hold the pivot rod in alternate raised or lowered positions, in a manner well known in the art.

The present description is for illustrative purposes only, and should not be construed to narrow the breadth of the present invention in any way. Thus, those skilled in the art will appreciate that various modifications might be made to the presently disclosed embodiments without departing from the spirit and scope of the invention. Other aspects, features, and advantages will be apparent upon an examination of the attached drawing Figures and appended claims.

What is claimed is:

1. A method of assembling a sun visor for use in a motor vehicle comprising the steps of:
    positioning a slidable visor pivot rod between first and second halves of a clamshell visor body;
    positioning an elongate nail member in the clamshell visor body such that a first end thereof is proximate a clip rod recess defined by the clamshell visor body, and a second end is proximate the slidable visor pivot rod;
    positioning a clip rod in the clip rod recess such that the clip rod and the elongated nail member are substantially axially aligned;
    pushing the pivot rod against the second end of the nail member, thereby driving the nail member through the clip rod and securing the clip rod in the recess.

2. The method of claim 1 wherein:
    the first end of the elongated nail member comprises an enlarged plastic head; and
    the second end of the elongated nail member comprises a pointed tip.

3. The method of claim 1 wherein the step of positioning the elongate nail member comprises positioning the elongate nail member such that it is slidably supported by molded protrusions in the clamshell visor body.

4. The method of claim 3 wherein the step of positioning the elongate nail member comprises positioning a tip thereof proximate and aligned with a pre-formed aperture connecting with the clip rod recess.

5. The method of claim 4 wherein the aperture is defined in part by the first half of the clamshell visor body and in part by the second half of the clamshell visor body.

6. The method of claim 1 wherein the step of pushing the slidable pivot rod against the elongated nail member comprises pushing the elongated nail member through the clip rod having a hollow center with an inner diameter sufficiently larger than an outer diameter of the elongated nail member such that the clip rod is rotatable relative to the elongated nail member.

7. The method of claim 1 wherein the step of pushing the slidable pivot rod against the elongated nail member comprises pushing the elongated nail member through the clip rod having a hollow center with an inner diameter substantially equal to an outer diameter of the elongated nail member such that the clip rod is secured against rotation relative thereto.

8. The method of claim 1 wherein the step of positioning the slidable visor pivot rod between first and second halves of the visor body comprises:
    engaging the first and second halves of the visor body about the slidable visor pivot rod, thereby positioning a portion of a molded channel in the first half and a portion of a molded channel in the second half about a pivot rod slider that rotatably journals the slidable visor pivot rod.

9. A visor assembled by the method of claim 1.

10. A method of securing a clip rod in a sun visor comprising the steps of:
    positioning a nail member proximate a recess in a molded plastic visor body;
    positioning a clip rod in the recess such that it is oriented substantially parallel with longitudinal edges of the visor body;
    pushing a slidable pivot rod assembly in the visor body against the nail member, thereby driving the nail member through the clip rod and securing the clip rod in the recess.

11. The method of claim 10 wherein the step of pushing the slidable pivot rod assembly against the nail member comprises pushing the nail member with an end of the slidable pivot rod.

12. The method of claim 10 wherein the step of pushing the slidable pivot rod assembly against the nail member comprises pushing the nail member with a slider that rotatably journals the slidable pivot rod.

13. A visor having a clip rod secured according to the method of claim 10.

14. A method of manufacturing a sun visor for a motor vehicle comprising the steps of:
    molding first and second visor halves, said visor halves being engageable to form a visor body, wherein the first and second halves define a channel extending longitudinally in the visor body, the channel having a first end proximate a recess in a periphery of the visor body, and further having a second end;
    positioning a pivot rod assembly between the visor halves such that it at least partially rides within the channel;
    positioning a nail member between the visor halves and proximate the first end of the channel;
    closing the visor halves such that they slidably capture at least a portion of the pivot rod assembly in the channel;
    sliding the pivot rod assembly against an end of the nail member and pushing the same through a clip rod that spans the recess, thereby securing the clip rod therein.

15. The method of claim 14 wherein the step of positioning the pivot rod assembly between the visor halves comprises positioning a combination slider and detent that rotatably journals a pivot rod between the visor halves.

16. The method of claim 15 wherein the step of sliding the pivot rod assembly against an end of the nail member comprises engaging an end of the pivot rod therewith.

17. The method of claim 15 wherein the step of sliding the pivot rod assembly against an end of the nail member comprises engaging a protrusion on an end of the combination slider and detent with the end of the nail member.

18. The method of claim 15 wherein the step of positioning the nail member between the visor halves comprises positioning the nail member such that it is supported in a position substantially parallel to longitudinal edges of the visor.

19. The method of claim 18 further comprising the step of molding supporting protrusions into at least one of the first and second visor halves such that the nail member positioned therebetween is substantially axially aligned with the clip rod spanning the recess, and is maintained in such orientation during the step of sliding the pivot rod assembly against the end of the nail member.

20. The method of claim 19 wherein the nail member is maintained substantially axially aligned with the clip rod via an interaction of a shaft of the nail member with supporting protrusions on both of the first and second halves.

21. The method of claim 20 wherein an interaction of a plastic head of the nail member with supporting protrusions on at least one of the first and second halves facilitates positioning of the nail member in an appropriate longitudinal position relative to the recess.

22. A sun visor manufactured by the method of claim 14.

\* \* \* \* \*